(12) United States Patent
Luquet et al.

(10) Patent No.: US 8,393,274 B2
(45) Date of Patent: Mar. 12, 2013

(54) GAS GENERATOR FOR A SAFETY DEVICE FOR A MOTOR VEHICLE

(75) Inventors: Catherine Luquet, Quimper (FR); Laurent Costecalde, Antibes (FR); Igor Lamy, Guipavas (FR)

(73) Assignee: Autoliv Development AB, Vargarda (SE)

( * ) Notice: Subject to any disclaimer, the term of this patent is extended or adjusted under 35 U.S.C. 154(b) by 26 days.

(21) Appl. No.: 12/936,645

(22) PCT Filed: Apr. 10, 2009

(86) PCT No.: PCT/EP2009/054344
§ 371 (c)(1),
(2), (4) Date: Oct. 19, 2010

(87) PCT Pub. No.: WO2009/125015
PCT Pub. Date: Oct. 15, 2009

(65) Prior Publication Data
US 2011/0030572 A1 Feb. 10, 2011

(30) Foreign Application Priority Data

Apr. 10, 2008 (FR) ...................................... 08 52422

(51) Int. Cl.
*B60R 21/264* (2006.01)
*C06D 5/00* (2006.01)
(52) U.S. Cl. ...................................................... 102/530
(58) Field of Classification Search ................. 102/530, 102/531; 280/735, 741, 742, 743.1
See application file for complete search history.

(56) References Cited

U.S. PATENT DOCUMENTS

| 3,641,935 | A | * | 2/1972 | Gawlick et al. | ............... | 102/531 |
| 5,387,008 | A | * | 2/1995 | Lauritzen et al. | ............. | 280/741 |
| 5,531,475 | A | | 7/1996 | Meduvsky et al. | | |
| 5,645,298 | A | * | 7/1997 | Stevens et al. | ................ | 280/741 |
| 6,368,431 | B1 | * | 4/2002 | Mangum et al. | ............. | 149/19.7 |
| 2002/0007755 | A1 | * | 1/2002 | Perotto et al. | ................. | 102/530 |
| 2004/0053182 | A1 | | 3/2004 | Yoshida et al. | | |

FOREIGN PATENT DOCUMENTS

| AT | 6944 U1 | 6/2004 |
| DE | 10040822 A1 | 4/2001 |
| DE | 202006004008 U1 | 7/2006 |
| EP | 0709261 A | 5/1996 |
| EP | 1329365 A | 7/2003 |
| JP | 10006911 A | 1/1998 |

* cited by examiner

*Primary Examiner* — Bret Hayes
(74) *Attorney, Agent, or Firm* — Harness, Dickey & Pierce, P.L.C.

(57) ABSTRACT

A generator includes a tubular casing sealed by a bottom, with a wall crossed by discharge orifices. The generator further includes an adapter sleeve retained in the tubular casing by crimping, a pyrotechnic initiator, and a tubular filter covering the discharge orifices. A pyrotechnic charge is inserted between the adapter sleeve and the bottom. A charge securing arrangement includes, on the bottom side, a transverse partition, and on the open side, an open-worked washer urged towards the bottom. A sealing member is capable of breaking during combustion of the charge, to thereby allow the gases to escape out of the casing via the filter and the discharge orifices. After failure of the sealing member, the space occupied by the pyrotechnic charge is delimited axially by the open-worked washer and the bottom.

18 Claims, 1 Drawing Sheet

GAS GENERATOR FOR A SAFETY DEVICE FOR A MOTOR VEHICLE

CROSS-REFERENCE TO RELATED APPLICATIONS

Figure 1:
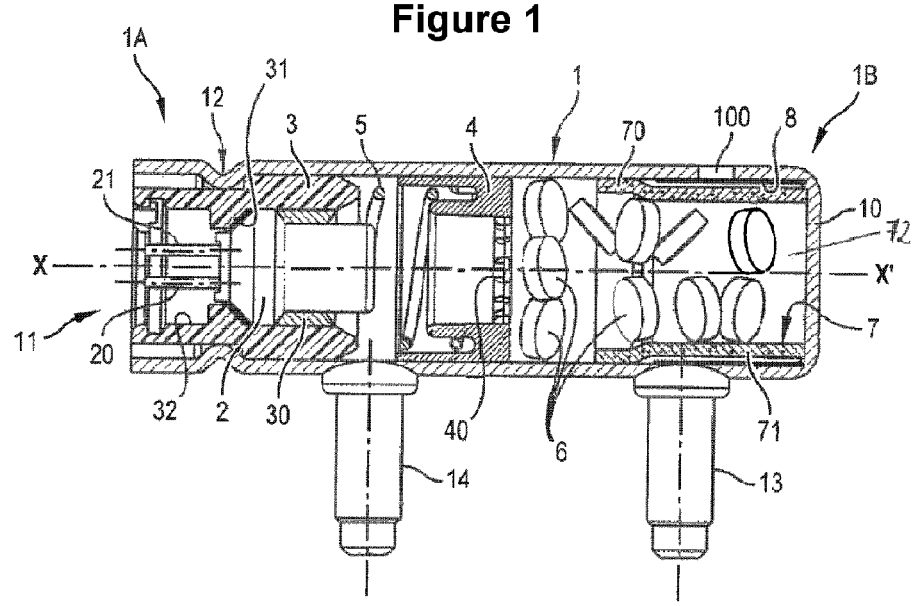

This application is a 371 U.S. National Stage of International Application No. PCT/EP2009/054344, filed Apr. 10, 2009, and published in English as WO 2009/125015 A1 on Oct. 15, 2009. This application claims the benefit of French Patent Application No. FR 0852422, filed Apr. 10, 2008, the disclosures of which applications are incorporated by reference herein.

FIELD

The present invention relates to a gas generator for a safety device for a motor vehicle, for example intended for inflating an inflatable protective bag.

DISCUSSION

An object of the present invention is to propose a generator combining the following advantages: high performances; operating reliability, notably as regards control of the combustion; compactness; lightness; low cost; and manufacturing simplicity.

From documents AT-0069441 and EP-1 329 365, gas generators, intended to be used in safety devices for motor vehicle, are already known. However, they do not meet the aforementioned criteria.

The present invention relates to a gas generator for a safety device for a motor vehicle, including a tubular casing. One end of the casing is open and the other end is closed by a bottom. A circumferential wall portion of the casing located in the vicinity of the bottom is crossed by discharge orifices. An adapter sleeve is housed in the open end portion of the tubular casing and axially retained in the latter by crimping. A pyrotechnic initiator is axially mounted inside the adapter sleeve and maintained fixedly in the adapter sleeve. A tubular filter is placed inside the closed end portion of the casing, so as to cover the discharged orifices. A pyrotechnic charge, consisting of bulk elements, is housed inside the tubular casing, between the adapter sleeve and the bottom.

This generator of the present invention includes structure for confining and securing, along the axial direction, the bulk elements making up the pyrotechnic charge. This structure includes a transverse partition on the bottom side and an open-worked washer urged in the direction of the bottom on the open side. A sealing member is interposed between the pyrotechnic charge and the discharge orifice. The sealing member is capable of breaking upon combustion of the pyrotechnic charge, then allowing the gases generated by the combustion of the pyrotechnic charge to escape out of the casing, via the wall of the filter and the discharge orifices. After breaking of the sealing member, the space occupied by the pyrotechnic charge is axially delimited by the open-worked washer and the bottom.

According to other possible advantageous but non-limiting characteristics of the invention, taken alone or as a combination:

after breaking of the sealing member, at least one portion of the pyrotechnic charge is inside the inner space of the tubular filter;

before breaking of the sealing member, the pyrotechnic charge is at least partly housed inside the filter and it is the actual bottom of the casing which, on this side, ensures confinement and securement of the pyrotechnic charge;

the sealing member consists in a sheet or film of fine thickness rolled as a cylinder and positioned coaxially outside the filter and inside the casing while inwardly covering the discharge orifices;

before breaking of the sealing member, the pyrotechnic charge is housed in a tubular case with a wall of fine thickness, coaxially fitted into the central area of the tubular casing, outside the filter, this case being open on the side of the washer and closed on the side of the bottom;

the washer penetrates and may slide inside the tubular case;

the tubular case is closed on the side of the bottom by a partition which, on this side, ensures confinement and securement of the pyrotechnic charge and which also acts as a sealing member;

the pyrotechnic charge consists of propellant tablets;

the washer is urged by a spring which tends to push it back in the direction of the bottom of the casing;

the washer is a sleeve in a deformable and compressible material, the compression of which acts on the pyrotechnic charge in order to secure it; and the filter has a widened portion on a part of its axial length turned towards the mouth of the casing.

Other features and advantages of the invention will become apparent upon reading the following description of two preferred embodiments of the invention.

DRAWINGS

Figure 2:
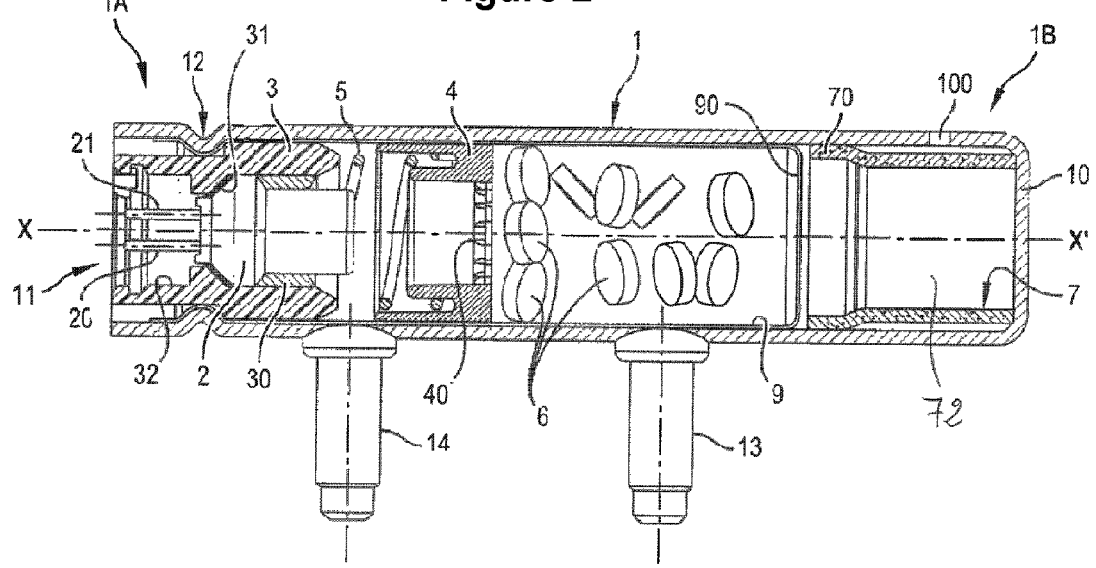

This description is made with reference to the appended drawings wherein:

FIG. 1 illustrates a gas generator according to the invention as an axial sectional view; and FIG. 2 is a view similar to the view of FIG. 1, which illustrates an alternative generator.

DETAILED DESCRIPTION

The gas generator illustrated in FIG. 1 includes a cylindrical tubular casing 1 along an axis X-X'. One end 1A of the casing 1 (on the left of FIG. 1) is open, having a mouth 11. The other end 1B of the casing 1 is closed, sealed by a flat bottom 10 positioned transversely, i.e., perpendicularly, to the axis X-X'.

The circumferential wall portion of the casing 1 located in the vicinity of this bottom 10 is crossed by several discharge orifices 100 radially pierced in the wall of the casing 1.

This generator includes a pyrotechnic initiator 2 of a customary type, with connecting pins 20, 21. The initiator is positioned axially in the mouth 11 of the casing 1.

More specifically, the pyrotechnic initiator 2 is mounted inside an intermediate part 3, which will be designated as an "adapter sleeve".

The adapter sleeve 3 has an inner contour aperture mating that of the initiator 2. This aperture, on the "open" side of the casing 1 (to the left of FIG. 1), has a frusto-conical shoulder against which a bevelled face will abut with a shape mating the body of the initiator 2. A ring-shaped seal gasket which is squeezed between the two faces pressing against each other. On the opposite side (to the right of FIG. 1), the initiator 2 is maintained centered along the axis X-X' and retained from axial translation by a stop bushing 30. The stop bushing 30 is force-fitted and/or adhesively bonded to the inside of the adapter sleeve 3.

The adapter sleeve 3 is fitted into the mouth 11 of the casing 1 and fixedly retained inside the casing by crimping, by a ring-shaped wall necking 12 which will penetrate into a peripheral groove of the adapter sleeve 3.

The adapter sleeve 3 may be made by bar turning operation, stamping or cold heading, for example.

Thus, the sub-assembly consisting of the adapter sleeve 3 and of the pyrotechnic initiator 2 is fixedly mounted in the end portion 1A of the casing 1. This assembly may notably be made by crimping or welding.

On the other side of this casing 1, a cylindrical tubular filter 7 is fitted inside the closed end portion of the casing 1 so as to cover the discharge orifices 100.

This filter 7 has a gas-pervious wall, with a relatively small thickness. The filter 7 is made in a lightweight material resistant to hot gases generated by combustion and has a porous, perforated and/or meshed structure, adapted for this kind of application.

The function of the filter 7 is to prevent untimely escape of constitutive elements of the pyrotechnic charge and of other solid particles, out of the casing through the orifice, or through the orifices 100, during combustion.

The tubular filter 7 has a widened portion over a small axial length 70, turned towards the mouth of the casing 1 (to the left of FIG. 1, accordingly). This portion 70 has an outer diameter equal to the inner diameter of the casing 1 so that it is fitted axially thereon without any clearance, and is retained by force and/or with adhesive bonding.

The remainder of the wall of the tubular filter 70, which forms the main portion 71, has a slightly smaller diameter. The main portion 71 bears against the bottom 10 on the "closed" side and is surrounded by a metal sheet 8 wound as a cylinder, of a brittle, not very ductile material and having a very small thickness. This sheet 8 is adhesively bonded to the inside of the casing 1, lining the inner face and covering the series of orifices 100. The orifices 100 are therefore inwardly covered with a dual wall: that of the filter 7 and that of the metal sheet 8.

This metal sheet 8, or seal, allows a rise in pressure before failure, inside the space designated as "combustion chamber", wherein the combustion of the pyrotechnic charge 6 takes place. This ensures good combustion of the pyrotechnic charge.

The gas generator according to the present invention comprises a pyrotechnic charge which here includes a mass of bulk elements 6, such as propellant tablets. The bulk elements 6 are contained inside the tubular casing 1, on the side of the bottom 10. Most of the bulk elements 6 entirely occupy the inner space of the filter 7. A portion of the bulk elements 6 emerge from the tubular casing 1 towards the open side 1A.

In the middle portion of the body of the tubular casing 1, between the sub-assembly consisting of the adapter sleeve 3 and of the pyrotechnic initiator 2 and the filter 7 containing the pyrotechnic charge, a securing part (or washer) 4 is disposed inside the casing 1. The securing part 4 is capable of sliding axially without any notable clearance. This securing part 4 is urged by a compression coil spring 5. The compression coil spring is supported against the adapter sleeve 3 and tends to move the securing part towards the bottom 10 (to the right of FIG. 1), as a piston. The washer 4 has a front openworked (for example, perforated or meshed) face 40, which will bear against the mass of bulk elements 6, propellant tablets or other elements which form the pyrotechnic charge. The meshes of this face 40 have a passage section clearly smaller than the particle size of the bulk elements 6 so that the bulk elements cannot pass through it.

Thus, with the washer 4 and the spring 5, the dead space left within the load of tablets may be compensated and this load may be secured.

In an alternative (not shown), the washer 4 and the spring 5 may be replaced with a plug in a flexible and compressible material, for example a foam, dimensioned in such a way that upon closing the casing, the plug will bear against the charge for securing it. This plug may assume the shape of a cylindrical sleeve interposed between the charge 6 and the initiator 2 and partly fitted on the initiator 2 through its central aperture. When it is set into place, it is slightly compressed, so as to act on the charge and to secure it.

References 13 and 14 designate attachment members, studs for example, firmly attached to the casing 1. The attachment members 13, 14 allow the mounting of the gas generator on a support, for example on a seat or frame component of a motor vehicle.

By simply observing FIG. 1, it is possible to realize that the number of applied components is reduced. Further, the components have simple shapes, and it is easy to assemble them. This tends to reduce the cost of this generator.

The casing 1 may consist in a "blind" metal tube formed in a well-known way from a planar metal sheet blank, in several successive stamping/drawing steps, and then radially perforated with a punch or punches in order to form the orifices 100, only one of which is illustrated in FIG. 1.

The metal sheet 8 may consist in a simple cylindrical tube section. However, it preferably consists in a simple self-adhesive metal label applied and adhesively bonded on the inner wall of the casing 1.

The filter 7 consists in a rolled metal sheet in order to form a cylindrical tube, the end area 70 of which has been slightly flared by means of a radially expansible mandrel.

The adapter sleeve 3 and the washer 4 may be molded parts, for example in plastic.

The bushing 30 is a simple tubular sleeve with beveled edges.

The initiator 2 may be of standard type, used for fitting out other models of generators.

The gasket 31 is a simple O-ring gasket in elastomeric material.

The whole of these components is very simply set into place in the casing 1 through its mouth 11. One begins by axially inserting the pyrotechnic initiator 2 into the adapter sleeve 3, by compressing the gasket 31, and then the blocking bushing 30 is set into place, so that the sub-assembly consisting of the initiator 2 and of the adapter 3 may be obtained.

The metal sheet or film 8 and the filter 7 are introduced into the inside of the casing 1 so that they will bear against the bottom 10. It will be noted that the filter 7 may not bear against the bottom 10 from the moment that it covers the discharge orifices 100.

The suitable dose of propellant tablets 6 is set into place.

The washer 4 and spring 5 are introduced.

The sub-assembly consisting of the initiator 2 and of the adapter 3 is fitted into the mouth 11.

The wall of the casing 1 is crimped around the sub-assembly.

Under the permanent thrust exerted by the spring 5, the mass of propellant tablets 6 is confined and packed in the closed end portion of the casing 1, which prevents formation of dust in the case of vibrations or impacts.

The vehicle equipped with such a generator is provided with deceleration sensors. In the case of an accident, the deceleration sensors produce an electric signal transformed into a pyrotechnic signal by the initiator 2. The latter causes the ignition of a primary pyrotechnic charge that produces heat and pressure, which propagate right up to the propellant tablets 6 through the apertures of the open-worked face 40 of the washer. This has the effect of initiating combustion of the tablets, which by burning, generate hot high pressure gases, causing failure of the metal sheet or film 8 at right angles to the discharge orifices 100, by shearing. This metal sheet or film 8, in a brittle material (not very ductile), therefore acts as a seal.

As discussed earlier, a portion of the bulk elements 6 forming the pyrotechnic charge occupies the inner space 72 of the filter 7. The combustion of these elements therefore occurs in this inner space 72, in close proximity to the discharge orifices 100. This space in which takes place the combustion, called "combustion chamber" 72, therefore extends at least partly inside the filter 7. This combustion chamber 72 is axially delimited by the bottom 10 and by the washer 4.

Moreover, the produced gases then escape in a controlled way, depending on the combustion rates and on the cross-section of the passage through the discharge orifices 100, and feed the safety device to which the generator is assigned (an inflatable protective bag, for example).

By this particular structure of the gas generator, the risk of fast propagation of the combustion which may occur when the combustional tablets burn far from the discharge orifices 100 is thereby minimized. Indeed, the tablets 6 present inside the filter 7 are distributed on either side of the orifices 100 along the axial direction X-X' (i.e., on the right and on the left of each orifice 100 in FIG. 1). Consequently, no tablet 6 is exposed to one-hundred percent (100%) of the flows of gases stemming from the combustion of the other tablets 6, since the gases for example stemming from the combustion of the tablets 6 located on the right of a given orifice 100 will be discharged through this orifice without entering into contact with the tablets 6 located on the left of this same orifice. With this, it is possible to avoid local overpressures which may affect combustion.

Finally, it will be noted that it is thereby possible to increase the size and therefore the amount of the pyrotechnic load 6, without any risk of ending up with rapid propagation of the combustion, so that it is possible to inflate protective bags with a larger volume or to inflate a bag for a longer period, for example.

FIG. 2 illustrates an alternative of the gas generator which has just been described. In FIG. 2, the same reference characters as those used in FIG. 1 for designating identical or similar elements have been retained. These common elements will not be again described hereafter in order not to unnecessarily burden the present description.

The alternative of FIG. 2 is essentially distinguished from the embodiment of FIG. 1, by the fact that the pyrotechnic charge mass 6 is not housed inside the filter 7 as long as the gas generator is not activated on the one hand, and by the fact that the filter 7 is not surrounded by a sealing sheet or film 8 on the other hand. Indeed, the sealing member 4 is located here upstream from the filter 7, considering the direction of propagation of the gases. More specifically, the propellant tablets 6 are encapsulated in a case 9. The case is a cylindrical tubular case 9, with a wall of fine thickness, in a not very ductile material, for example steel. The case 9 is fitted without any notable clearance inside the casing 1. The case 9 is open at one end (side 1A) and closed on the other end by a transverse flat bottom 90.

The case 9 and the filter 7 are positioned coaxially, end-to-end. This case 9 is thereby dimensioned and positioned in such a way that the washer 4 penetrates and slides into the area of its mouth, while its bottom 90 is located at the entry of the filter 7. The wall of the bottom 90, which here forms the sealing member, is optionally recessed with lines of lesser strength favoring its cutting out according to a determined profile, as "petals" for example, under the effect of an overpressure inside the case 9.

Here, the mass of propellant tablets 6 is confined and slightly packed inside the case 9 under the thrust of the washer 4 which is urged by the spring 5. This prevents the risk of generating dusts in the case of vibrations and impacts.

Upon activation of the generator as a result of an accident, the tablets 6 begin their combustion and generate hot pressurized gases. Under the action of this pressure, the complete or partial failure of the bottom 90, which opens (for example as petals), is first of all observed. This failure causes the increase in volume of the combustion chamber, which opens into the inner space 72 delimited by the tubular filter 7 and axially by the bottom 10. At least one portion of the tablets 6 is then displaced under the action of the pressure of the gases and will occupy the inner space 72 of the tubular filter 7, as for example illustrated in FIG. 1. The combustion of the tablets 6 continues while the tablets 6 are in the filter 7.

The combustion gases also pass into the inside of the filter 7, and are then discharged through the discharge orifices 100.

It will be noted that the flared shape of the widened portion 70 of the tubular filter 7 facilitates opening of the bottom 90 when the latter fails, for example as petals. The bottom 90 may open more widely towards the walls of the tubular casing 1 and the pyrotechnic charge tablets 6 may penetrate into the inside of the tubular filter 7 even more easily.

This second alternative embodiment of the generator provides the same advantages as the first, as regards controlling combustion of the charge 6. As soon as the generator is activated, the pyrotechnic charge moves at least partly into the filter 7 and combustion, and therefore evolvement of gases, occur in close proximity to the discharge orifices 100, according to the modes described earlier.

Moreover, it will be noted that the first embodiment (FIG. 1) has the advantage of being axially more compact than the second (FIG. 2), since the length of the filter 7 is not added to the space occupied by the charge 6.

The second embodiment has the advantage of simplifying the manufacturing method since it allows separate preparation of a sub-assembly or "cartridge" comprising the adapter sleeve 3, the pyrotechnic initiator 2, the washer 4, the spring 5 (optionally) and the pyrotechnic charge 6, loaded into the case 9, and then introduction of the latter into the inside of the casing 1.

Further, with this, it is possible to enlarge the volume of the combustion chamber after failure of the bottom 90 of the case 9. Consequently, there is a larger dead space or "dead volume" between the tablets 6 and the generated combustion gases may pass in-between said tablets 6 without causing rapid propagation of combustion.

By its lightness and its low bulkiness, such a generator is particularly adapted to applications for laterally protecting the occupants of a motor vehicle. Also, it may be used in systems of the "active structure" type in the door of a motor vehicle.

The invention claimed is:
1. A gas generator for a safety device for a motor vehicle, the gas generator comprising:
 a tubular casing having a first end and a second end, the first end being open, the second end being closed off by a bottom, the tubular casing defining a plurality of discharge orifices;
 an adapter sleeve housed in the open end of the tubular casing and axially retained in the casing;

a pyrotechnic initiator axially mounted in the inside of the adapter sleeve and fixedly maintained in the adapter sleeve;

a tubular filter disposed inside the closed end of the casing so as to cover the discharge orifices, the tubular filter defining a hollow interior;

a pyrotechnic charge including a plurality of bulk elements inside the tubular casing axially between the adapter sleeve and the bottom;

a tubular case disposed in the tubular casing encapsulating the pyrotechnic charge prior to combustion of the pyrotechnic charge, the case co-axially oriented relative to the tubular filter; and a securing part sealing an open end of the case;

wherein a transverse end wall of the case is proximate the tubular filter and adapted to at least partially fail and open upon initial combustion of the pyrotechnic charge, thereby allowing the gases generated by combustion of the pyrotechnic charge to escape out of the casing, via the wall of the filter and the discharge orifices, and in that after the at least partial failure and opening of the case, an open space occupied by the pyrotechnic charge is axially delimited only by the securing part and the bottom of the tubular casing.

2. The gas generator according to claim 1, wherein after the at least partial failure and opening of the transverse end wall, the gas generator is configured such that at least a portion of the pyrotechnic charge is inside an inner space of the tubular filter.

3. The gas generator according to claim 1, wherein the securing part is radially disposed within the case and axially moveable with the case.

4. The gas generator according to claim 1, wherein the pyrotechnic charge includes a plurality of propellant tablets.

5. The gas generator according to claim 1, further comprising a coil spring for axially urging the securing part toward the bottom.

6. The gas generator according to claim 1, wherein the securing part is constructed of a deformable and compressible material, the compression of which acts on the pyrotechnic charge for securement.

7. The gas generator according to claim 1, wherein the filter has a widened portion on a part of its axial length turned towards the mouth of the casing.

8. The gas generator of claim 1, wherein the tubular casing includes a circumferential sidewall and the plurality of discharge openings are provided in the circumferential sidewall.

9. A gas generator for a safety device for a motor vehicle, the gas generator comprising:

a tubular casing having a first end and a second end, the first end being open, the second end being closed off by a bottom, the tubular casing defining a plurality of discharge orifices;

a pyrotechnic initiator axially received within the first end;

a tubular filter disposed within the tubular casing proximate the second end so as to cover the discharge orifices, the tubular filter defining a hollow interior;

a pyrotechnic charge including a plurality of bulk elements; and a tubular case disposed in the tubular casing and encapsulating the pyrotechnic charge prior to combustion of the pyrotechnic charge, the case co-axially oriented relative to the tubular filter, the tubular case having a transverse end wall proximate the tubular filter, the transverse end wall adapted to at least partially fail and open upon initial combustion of the pyrotechnic charge, such that an open space occupied by the pyrotechnic charge is axially delimited in a first direction by the bottom of the tubular casing and radially delimited at least in part by the tubular filter.

10. The gas generator according to claim 9, wherein the tubular case and the filter are oriented in an end-to-end relationship.

11. The gas generator according to claim 9, wherein after the at least partial failure and opening of the transverse end wall, the gas generator is configured such that at least a portion of the pyrotechnic charge is inside an inner space of the tubular filter.

12. The gas generator according to claim 9, wherein the pyrotechnic charge includes a plurality of propellant tablets.

13. The gas generator according to claim 9, further comprising a securing part sealing the first end of the case.

14. The gas generator according to claim 13, further comprising a spring for axially urging the securing part toward the bottom.

15. The gas generator according to claim 13, wherein the securing part is constructed of a deformable and compressible material, the compression of which acts on the pyrotechnic charge for securement.

16. The gas generator of claim 9, wherein the tubular casing includes a circumferential sidewall and the plurality of discharge openings are provided in the circumferential sidewall.

17. A gas generator for a safety device for a motor vehicle, the gas generator comprising:

a tubular casing having a closed end, an open end, and a plurality of discharge orifices;

a pyrotechnic initiator axially received within the open end;

a tubular filter disposed within the tubular casing proximate the closed end so as to cover the discharge orifices, the tubular filter defining a hollow interior;

a pyrotechnic charge disposed in the tubular casing;

a tubular case disposed in the tubular casing and encapsulating the pyrotechnic charge prior to combustion of the pyrotechnic charge, the case co-axially oriented relative to the tubular filter, the tubular case having a transverse end wall proximate the tubular filter, the transverse end wall adapted to at least partially fail and open upon initial combustion of the pyrotechnic charge, such that an open space occupied by the pyrotechnic charge is axially delimited in a first direction only by the closed end of the tubular casing and radially delimited at least in part by the tubular filter; and an open space proximate the second end of the tubular casing, the open space radially delimited only by the tubular filter and axially delimited in a first direction by the closed end and in a second direction by the transverse end wall such that the pyrotechnic charge is free to occupy the entirety of the open space upon at least partial failure of the transverse end wall.

18. The gas generator of claim 17, wherein the tubular casing includes a circumferential sidewall and the plurality of discharge openings are provided in the circumferential sidewall.

* * * * *